Figure 1:
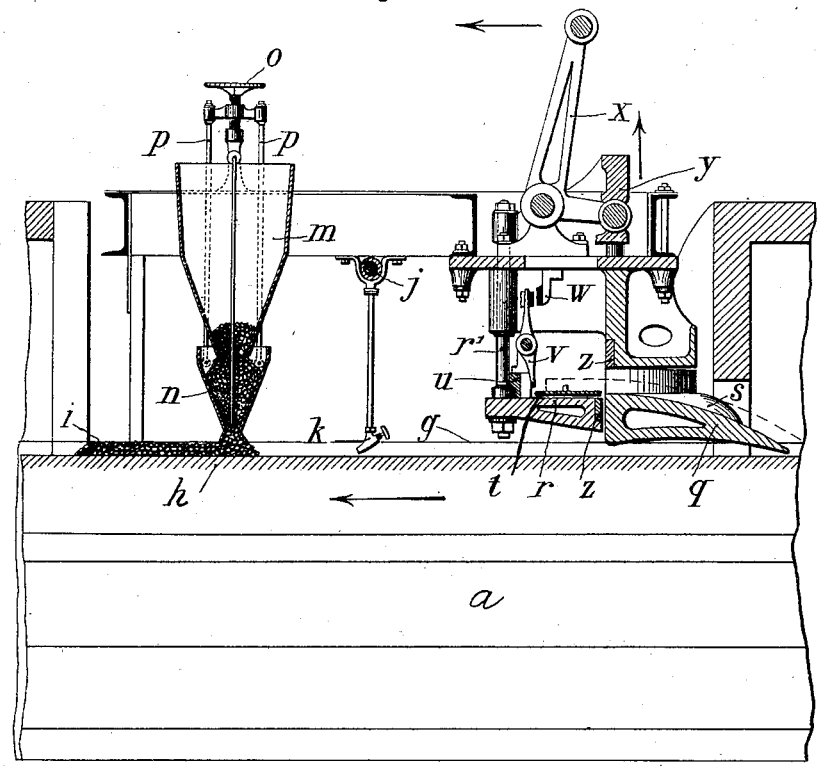

No. 753,695. PATENTED MAR. 1, 1904.
L. A. GARCHEY.
MANUFACTURE OF GLASS STONE.
APPLICATION FILED DEC. 8, 1902.
NO MODEL. 2 SHEETS—SHEET 1.

Witnesses:
C. D. Kesler,
James L. Norris, Jr.

Inventor
Louis A. Garchey
By James L. Norris.
Atty.

No. 753,695. PATENTED MAR. 1, 1904.
L. A. GARCHEY.
MANUFACTURE OF GLASS STONE.
APPLICATION FILED DEC. 8, 1902.
NO MODEL. 2 SHEETS—SHEET 2.

Witnesses
C. D. Hesler
James L. Norris, Jr.

Inventor
Louis A. Garchey
By James L. Norris.
Atty.

No. 753,695. Patented March 1, 1904.

UNITED STATES PATENT OFFICE.

LOUIS ANTOINE GARCHEY, OF PARIS, FRANCE.

MANUFACTURE OF GLASS STONE.

SPECIFICATION forming part of Letters Patent No. 753,695, dated March 1, 1904.

Application filed December 8, 1902. Serial No. 134,433. (No model.)

*To all whom it may concern:*

Be it known that I, LOUIS ANTOINE GARCHEY, a citizen of the French Republic, residing at Paris, France, have invented certain new and useful Improvements in and Relating to the Manufacture of Glass Stone, of which the following is a specification.

This invention relates to the manufacture of glasss stone, and has for its objects to provide a new and improved apparatus or improvements in the apparatus employed therefor in order to obtain such articles in greater quantities and at lower cost than hitherto.

With the process now in use glass is devitrified in sand molds, which impart to the pasty glass a form approximately that of the final one. This final form is given to the devitrified block by means of a hydraulic press. The disadvantages of this process are that, first, the sand of the mold adheres to the pasty glass and imparts to the outer surface of the finished block a rough or wrinkled appearance. In order to give the product a neat finished appearance, it is necessary that a part of the glass be cut away. This result can be accomplished by mechanical shearing; but this operation causes a serious waste of glass; second, the cutting of the glass mass or paste involves considerable wear on the press-matrices. All these disadvantages are obviated by the present invention, according to which the glass is treated as follows: Broken glass is placed on the movable circular bed of a furnace, which bed is provided with a series of annular grooves or channels for the reception of the glass, thus constituting molds for the said glass. In order to prevent the molten glass adhering to the molds, a liquid is applied thereto containing in suspension carbonate of magnesia, talc, carbonate of lime or sulfate of lime, or any suitable refractory substance to which the molten glass does not adhere. Said liquid is sprayed over the molds before the latter are filled with glass, and the liquid being evaporated under the action of the heat a thin film of insulating material is left on the inner side of the mold. As the bed of the furnace revolves the glass is initially melted into continuous circular strips, which are subsequently devitrified by passing slowly through the cooling-chamber of the furnace. At a convenient point a mechanical cutter is arranged, which cuts the strips into blocks at regular intervals. The blocks only need to be brought to the final form by the press unless the press cuts away parts of said blocks. This process insures the manufacture of the blocks in a continuous manner, and in one operation of the cutter as many blocks are obtained as there are grooves or molds in the bed of the furnace.

The invention, furthermore, contains detailed arrangements, which will be hereinafter described.

An apparatus including an embodiment of the invention is illustrated in the accompanying drawings, in which—

Figure 2:
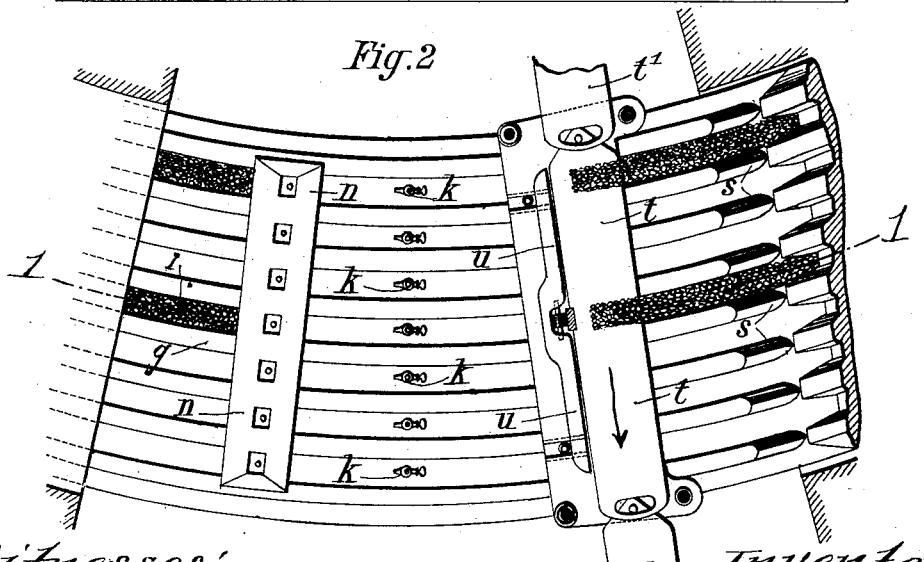
Figure 3:
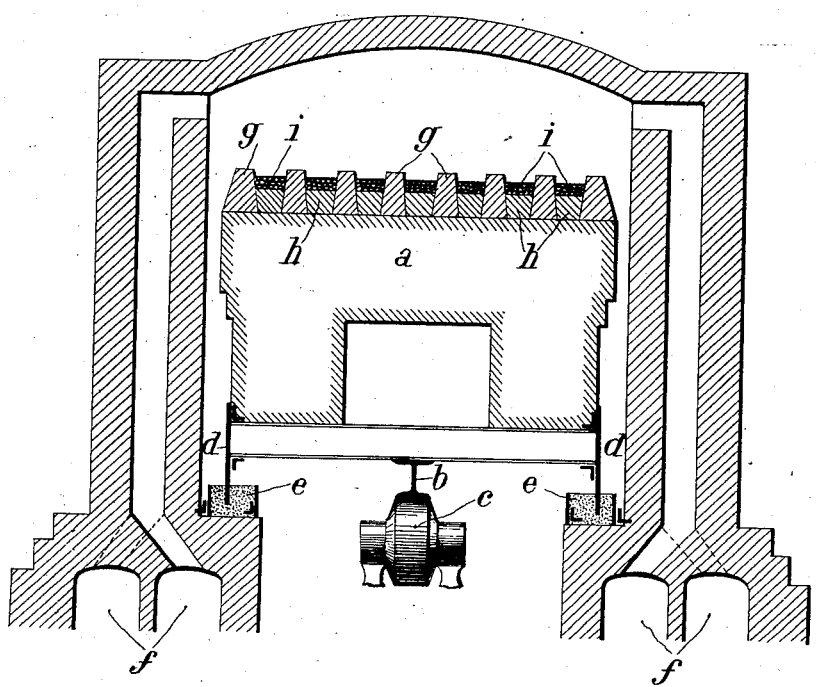

Figure 1 is a sectional side elevation of a part of the furnace including the invention and illustrating the glass distributing and cutting mechanisms, the section being taken in the line 1 1, Fig. 2. Fig. 2 is a sectional plan view of the same, the section being taken just above the furnace-bed. Fig. 3 is a transverse section through the movable bed of the furnace and the heating-chamber.

Like characters of reference refer to like parts throughout the views.

The furnace may be of any suitable kind, it being provided with an annular movable bed $a$, of refractory material, supported by a rail $b$, which rests on rollers $c$. Any suitable means may be provided for rotating said bed and which may consist in forming the lower edge of the rail $b$ to constitute a rack and providing the rollers $c$ with corresponding teeth, one or more of which may receive a rotary motion from a suitable motor. Cheeks or plates $d$ depend from the said bed and are let into sand, filling the troughs $e$ to provide an air-tight heating-chamber. The furnace also includes regenerators $f$ of the usual character. The bed proper is formed by refractory pieces $g$ of trapezoidal form, between which pieces $h$ of less thickness are arranged, so as to form in the bed a series of annular channels or molds $i$ for receiving the glass to be devitrified.

$j$ is a pipe or conduit which conveys the liquid above mentioned to the molds. The liquid is continuously projected into each of the channels or molds $i$ by a series of sprayers $k$.

The broken glass is placed in a large hopper $m$, at the lower part of which are as many nozzles $n$ as there are channels $i$, each nozzle entering the corresponding channel. The thickness of the layer of glass is determined by the distance which separates the lower edge of the nozzle from the bottom of the passage. This can be regulated for each of the passages by rotating the hand-wheels $o$, which actuate the rods $p$, carrying the nozzles $n$. The thickness of each layer can thus be specially regulated in such a manner that all the channels, although of unequal length or circumference, nevertheless receive the same quantity of glass.

In the hopper $m$ and in each of the nozzles $n$ a mechanical stirring device may be arranged in order to prevent the formation of hollows or cavities and to insure the free descent of the glass.

The broken glass delivered to the molds in the manner hereinbefore described travels successively through the heating and cooling chambers of the furnace, the bed of which has a continuous circular movement. The heating-chamber, Fig. 3, and the cooling-chamber (not shown) and the working or feeding and delivering station, Figs. 1 and 2, are arranged in the circle in which the bed moves. The glass is first melted in the heating-chamber and is subsequently devitrified by the slowly-decreasing heat in the cooling-chamber. The speed of the rotary bed and the intensity of heat in the furnace are regulated so that the operation goes on under the most efficient conditions. The glass finally reaches the opening of the working chamber in the form of continuous strips of devitrified glass.

At the opening of the working chamber and pointing toward the interior thereof is arranged a stripping device or plow $q$ in the form of a comb with inclined teeth, each of which extends into the bottom of one of the passages $i$ and forces the strip of devitrified glass to leave the bed which holds it, so that it rises by the tooth onto the lower platform $r$ of the automatic cutting apparatus. Each strip is continuously guided by means of vertical webs or partitions $s$, secured to the piece $q$ and corresponding in position to the refractory separating-pieces $g$ between the channels or molds. On the platform $r$ a plate $t$ is mounted to receive the ends of the strips of glass after leaving the bed. This plate has an aperture at one end and a pin at the other in order to enable it to be coupled quickly with a similar plate $t'$. A straight-edge $u$, which can be moved forward as desired, permits of regulating the length of the parts of the strip to be cut. For this purpose it has a tappet $v$, which runs down in front of one of the strips. When this strip touches the lower end of the tappet $v$, the tappet turns on its axis, and its upper end comes against a stationary contact $w$, whereby an electric circuit is completed, which actuates the cutter in any suitable manner. In the arrangement shown in the drawings we assume that this electric circuit is intended to control the distribution-valve of a hydraulic cylinder or motor, the piston of which is connected with the lever $x$, whereby the raising of the frame $y$ is determined. The platform $r$ is connected with this frame $y$ by means of rods $r'$. The ends of the strips of glass are thus all simultaneously cut off between the blades $z$. These blades can obviously be easily replaced by others when necessary. As soon as the cutting is effected the workman draws the plate $t$ in the direction of the arrow, Fig. 2, whereby the plate $t'$ takes the place of the plate $t$. The pasty blocks as they are cut off are carried to a hydraulic press of some suitable kind, where they receive the final form. Instead of broken glass in a solid state liquid glass may be run into the channels or molds $i$, and in this case a suitable melting-furnace should be combined with the heating-furnace and the form of the nozzles $n$ should be conveniently modified for the purpose of effecting the proper regulation in thickness of the layer or strip of glass.

Having thus described the invention, what is claimed as new, and desired to be secured by Letters Patent, is—

1. In an apparatus of the class described, a furnace including a circular movable bed having annular grooves for the reception of glass, a hopper for distributing the glass in said grooves, spraying means for scattering into the grooves a liquid containing insulating material, and means for cutting the glass strips formed by the grooves into suitable blocks.

2. In an apparatus of the class described, a furnace having a circular movable bed provided with annular grooves to receive broken glass, a hopper for containing the glass, a nozzle for receiving the glass from the hopper and delivering same to said grooves, and means for adjusting the nozzle with respect to the hopper.

3. In an apparatus of the class described, a furnace including a circular movable bed having annular grooves, means for delivering broken glass into said grooves, means for cutting the glass into blocks, and means for removing the blocks.

In testimony whereof I have hereunto set my hand in presence of two subscribing witnesses.

LOUIS ANTOINE GARCHEY.

Witnesses:
AUGUSTUS E. INGRAM,
ALFRED FREY.